US006928707B2

(12) United States Patent
Anderson et al.

(10) Patent No.: US 6,928,707 B2
(45) Date of Patent: Aug. 16, 2005

(54) CCFL WRAPPED WITH A HEATER WIRE, AND MACHINES FOR MANUFACTURING SAME

(75) Inventors: Todd J Anderson, Ft. Collins, CO (US); Nigel Meing-Fai Cheung, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 10/300,121

(22) Filed: Nov. 19, 2002

(65) Prior Publication Data

US 2004/0095083 A1 May 20, 2004

(51) Int. Cl.[7] .................................................. B23C 1/00

(52) U.S. Cl. ......................... 29/56.5; 140/71.5; 29/836; 445/69

(58) Field of Search ............................. 140/71.5, 71 C; 29/56.5, 836; 445/59–69

(56) References Cited

U.S. PATENT DOCUMENTS 3,698,050 A * 10/1972 Rubin .......................... 445/49
3,703,033 A * 11/1972 Alessio et al. ................ 29/836
3,717,917 A * 2/1973 Marks ........................ 29/56.5
4,799,518 A * 1/1989 Haug ........................ 140/71.5
5,029,311 A 7/1991 Brandkamp et al.
5,907,742 A 5/1999 Johnson et al.
5,909,085 A 6/1999 Nelson
6,313,586 B1 11/2001 Yamamoto et al.
2002/0140996 A1 10/2002 Spears et al.

FOREIGN PATENT DOCUMENTS

JP 2004-172115 * 6/2004

* cited by examiner

*Primary Examiner*—Wilson Lee

(57) ABSTRACT

One aspect of the invention is embodied in a machine for wrapping a heater wire around a cold cathode fluorescent lamp (CCFL). The machine includes means for holding a CCFL, means for guiding a heater wire, and means for moving the holding means in relation to the guiding means for the purpose of wrapping a heater wire around a CCFL that is held by the holding means. Another aspect of the invention is embodied in a CCFL wrapped with a heater wire. The process used to wrap the CCFL involves inserting the CCFL into a socket of an automated machine and feeding the heater wire into a heater wire guide of the automated machine. The socket is then moved in relation to the heater wire guide, by means of the automated machine, for the purpose of wrapping the heater wire around the CCFL.

36 Claims, 6 Drawing Sheets

CCFL WRAPPED WITH A HEATER WIRE, AND MACHINES FOR MANUFACTURING SAME

BACKGROUND OF THE INVENTION

Cold cathode fluorescent lamps (CCFLs) are commonly used to illuminate the documents that are placed in scanners, copiers, and other imaging devices. A disadvantage associated with CCFLs is their relatively long warmup cycle. A warmup cycle, as defined herein, is the time that it takes a CCFL, once powered, to achieve an acceptable and stable light level for the purpose of illuminating a document that is to be scanned by a scanner, copier, or other imaging device.

SUMMARY OF THE INVENTION

One aspect of the invention is embodied in a machine for wrapping a heater wire around a CCFL. The machine comprises means for holding a CCFL, means for guiding a heater wire, and means for moving the holding means in relation to the guiding means for the purpose of wrapping a heater wire around a CCFL that is held by the holding means.

Another aspect of the invention is embodied in a CCFL wrapped with a heater wire. The process used to wrap the CCFL comprises inserting the CCFL into a socket of an automated machine and feeding the heater wire into a heater wire guide of the automated machine. The socket is then moved in relation to the heater wire guide, by means of the automated machine, for the purpose of wrapping the heater wire around the CCFL.

DESCRIPTION OF THE DRAWINGS

Illustrative embodiments of the invention are illustrated in the drawings, in which.

DETAILED DESCRIPTION

Figure 1:
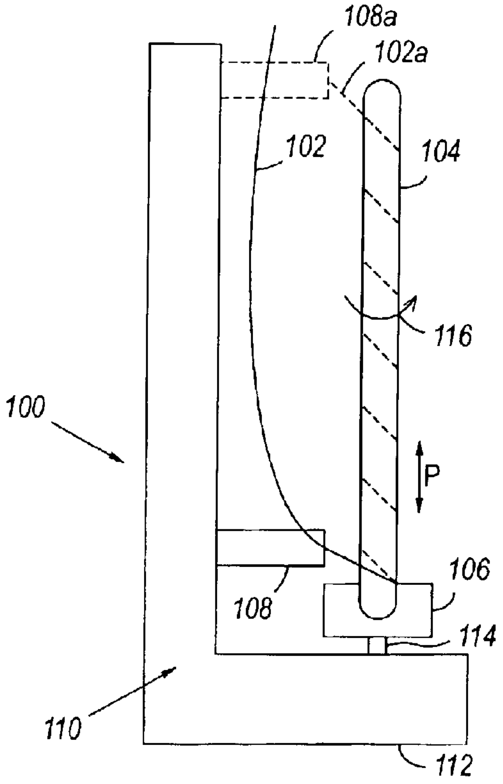
FIGS. 1–5 and 7–12 illustrate various machines for wrapping a heater wire around a CCFL.

FIGS. 1–5 and 7–12 illustrate a number of different machines 100, 200, 300, 400, 500, 700, 900, 1000, 1100, 1200 for wrapping a heater wire 102 around a cold cathode fluorescent lamp (CCFL) 104. In general, each of these machines comprises means 106, 702, 1102 for holding a CCFL 104; means 108, 202 for guiding a heater wire 102; and means 110, 204, 302, 402, 502, 704, 902, 1002, 1104, 1204 for moving the holding means in relation to the guiding means for the purpose of wrapping a heater wire 102 around a CCFL 104 that is held by the holding means. The first of these machines 100 is illustrated in FIG. 1.

The machine 100 comprises a lamp socket 106 and heater wire guide 108 that are generally supported by a housing 112. The lamp socket 106 may take a variety of forms, one of which is illustrated in FIG. 1. The lamp socket 106 serves to hold a CCFL 104 such that the lamp 104 may be rotated, and tight enough that a heater wire 102 may be wrapped snugly around the lamp 104 as the lamp is rotated, yet not so tight that the lamp 104 is likely to break. If external connection wires have already been attached to the end of a lamp which needs to be held by the socket 106, or if a lamp has already been capped at the end which needs to be held by the socket 106 (see, e.g, the lamp 600 with external connection wires 604–610 and boots 612, 614 illustrated in FIG. 6), then the socket 106 may be configured (e.g., shaped) to hold such a lamp.

The lamp socket 106 is supported by a shaft 114 that passes into the housing 112. In this manner, the socket 106 can be rotated by a control system 110. The control system 110 may take a variety of forms, some of which are illustrated in more detail in FIGS. 2 & 3 and will be described in more detail later in this description.

The heater wire guide 108 is movable between first and second positions, as illustrated in FIG. 1 by the guide 108 bounded by a solid line, and the guide 108*a* bounded by a broken line. The guide 108 travels along the axis of a CCFL 104 held by the socket 106. Movement of the guide 108 is controlled by the same control system 110 that rotates the lamp socket 106. In this manner, movement of the guide 108 can be initiated at or about the same time that rotation of the socket 106 is initiated.

A lamp 104 may be inserted into the machine 100 with or without a heater wire 102 already attached thereto. For example, a heater wire 102 may be wrapped around one end of a lamp 104, and then secured thereto by, for example, heat shrink tubing, a clamp, or an endcap. Alternatively, a heater wire 102 could be wrapped around one end of the lamp, and then the shape of the socket 106 could be used to keep the wire 102 from slipping in relation to the lamp 104. A heater wire 102 could also be attached to a lamp 104 subsequent to the lamp's insertion into the socket 106. For example, the end of a heater wire 102 could be sandwiched between a lamp 104 and the socket 106; or the socket 106 could otherwise hold a heater wire 102 in close proximity to a lamp 104.

Note that in each of the above embodiments, and throughout this Description, a CCFL "end" comprises, but is not limited to, the absolute end of a CCFL. Thus, in a broadest context, a CCFL comprises two ends and no middle. It should also be noted that the boundary between a lamp's ends may be such that it defines two ends of unequal size.

In use, the machine 100 operates as follows. First, a user or automated filler (not shown) inserts a CCFL 104 into the socket 106. If a heater wire 102 is attached to the lamp 104 prior to its insertion into the socket 106, or if a "loose" heater wire 102 is attached to the lamp 104 or socket 106 subsequent to the lamp's insertion into the socket 106, then the heater wire 102 is attached to the guide 108. Depending on the configuration of the guide 108, the heater wire 102 may be attached to the guide 108 by, for example, threading the heater wire 102 through the guide 108 or clipping the heater wire 102 to the guide.

Figure 4:
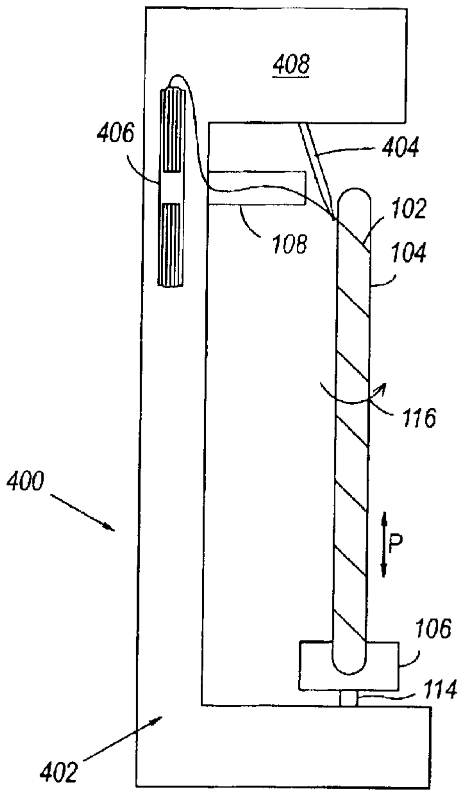

Although heater wires 102 can be precut to length for the lamps 104 that they will wrap, it is also contemplated that a quantity of heater wire 102 could be spooled within the machine 100 and then fed through or into the guide 108 (see, e.g., spool 406 in FIG. 4). In this manner, a heater wire 102 would most likely be cut to length for a particular lamp 104 after the wire 102 is wrapped around a lamp 104.

Once a lamp 104 is inserted into the socket 106 and a heater wire 102 is attached to the guide 108, the control system 110 may be activated to initiate rotation of the socket 106 and movement of the guide 108. As the lamp 104 rotates in the direction of arrow 116, and the guide 108 begins to move upward, the heater wire 102 is wrapped around the lamp 104 as indicated by the broken line 102*a*.

The rate of travel of the guide 108 may be adjusted in relation to the rate of rotation of the socket 106 so that the wire 102 wraps the lamp 104 at a desired pitch (P). This adjustment may be permanent (e.g., if the adjustment is contemplated in the machine's initial design and then fixed in the machine's hardware, software, etc.) or temporary (e.g., if the adjustment may be made by turning a knob, updating software, etc.). Alternatively, the guide 108 could be fixed at position 108*a*. If the guide 108 is fixed, the pitch (P) of the wire 102 will vary along the length of the lamp 104. This variance, however, can be limited by positioning the guide 108 sufficiently distant from the lamp 104.

Although the FIG. 1 machine shows a lamp 104 being wrapped bottom-to-top, a lamp 104 could also be wrapped top-to-bottom. If desired, lamps could even be wrapped in both directions so that a first lamp is wrapped bottom-to-top, a second lamp is wrapped top-to-bottom, and so on. The variants of machine 100 illustrated in FIGS. 2-5 may also wrap lamps top-to-bottom, bottom-to-top, or both.

Figure 2:
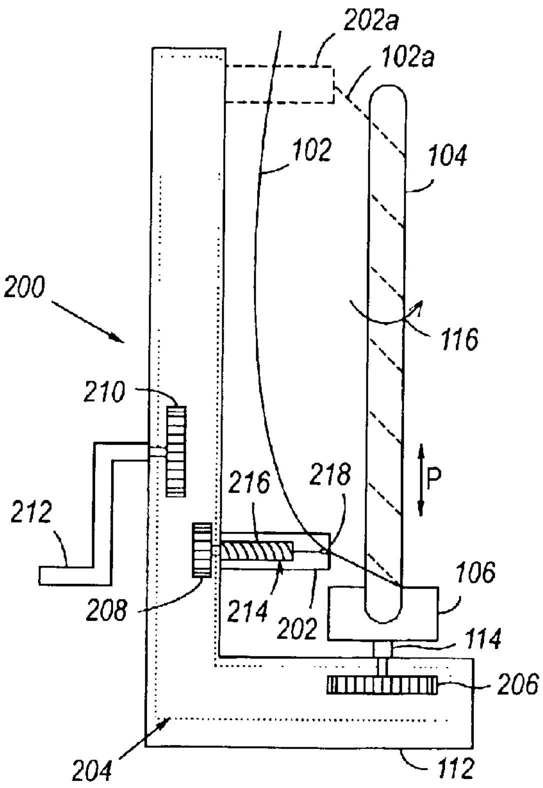

FIG. 2 illustrates a first variant of the FIG. 1 machine. The machine 200 functions similarly to the machine 100 illustrated in FIG. 1, but includes a gear set 204 that serves the purpose of part or all of the control system 110 identified in FIG. 1. The gear set 204 couples the machine's lamp socket 106 and heater wire guide 202 and comprises a first gear 206 that is attached to the shaft 114 of the lamp socket 106; a second gear 208 that is attached to the heater wire guide 202; and a third gear 210 that is attached to a crank 212 for initiating movement of the gear set 204. In addition to the gears 206–210 shown, the gear set 204 may comprise other gears and/or intermediary devices for the purpose of driving the gears 206–210 shown.

As will be understood by one of ordinary skill in the art, the gears 206–210 of the gear set 204 may be variously sized to adjust the pitch (P) of a heater wire 102 as it is wrapped around a lamp 104. Furthermore, the gears 206–210 illustrated in FIG. 2 are only exemplary, and the gears 206–210 of a gear set 204 could take a variety of forms, such as ring gears, pinion gears, worm gears, and so on. Some or all of the gears 206–210 illustrated in FIG. 2 could also be replaced by pulleys, and then connected with any number of belts, wires, tensioners, or other means.

The machine 200 illustrates a second variation over the machine 100. This second variation is a modified heater wire guide 202 comprising a tensioner 214. The tensioner 214 applies tension to a heater wire 102 that is guided by the guide 202. An exemplary embodiment of the tensioner 214 is shown to comprise a spring 216 that supplies tension to a noose 218 through which a heater wire 102 is threaded. However, the tensioner 214 could take a number of other forms.

Figure 3:
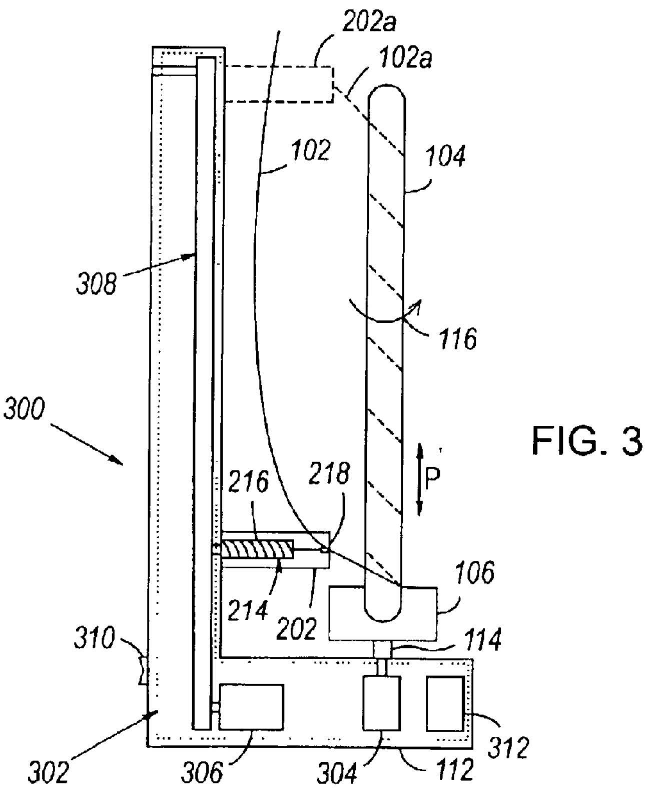

FIG. 3 illustrates a second variant of the FIG. 1 machine. Again, the machine 300 functions similarly to the machine 100 illustrated in FIG. 1. However, part or all of the control system 110 identified in FIG. 1 is electronically implemented. By way of example, an electronic control system 302 is shown to comprise a number of direct current (DC) motors 304, 306 (although the motors 304, 306 could also take the form of stepper motors, alternating current (AC) motors, or other types of motors). One of the DC motors 304 is coupled to drive the shaft of the machine's lamp socket 106, and the other DC motor 306 is coupled to drive a belt system 308 that in turn drives the heater wire guide 202. One of ordinary skill in the art will recognize that the two DC motors 304, 306 illustrated in FIG. 3 may be replaced with a single motor, and a gear set or other means may be used to transfer the single motor's force to both a socket drive subsystem and a guide drive subsystem.

The machine illustrated in FIG. 3 is provided with an optional switch 310 for initiating operation of the machine's electronic control system 302. The machine 300 is also provided with an optional memory 312 for storing a programmed sequence of instructions. The memory 312 may take any or all of the following forms: firmware, software, random access memory (RAM), or electrically erasable programmable read-only memory (EEPROM). The memory 312 could also take other forms. The instructions stored in the memory 312 can be fixed or programmable. That is, the memory 312 could take the form of a write-only memory that is burned with a predetermined set of instructions; or the memory 312 could take the form of a rewritable memory that a user can program via a user interface provided on the machine 300 or elsewhere (e.g., on a host computer that is coupled to the machine 300 via a direct or network connection).

FIG. 4 illustrates a third variant of the FIG. 1 machine. In FIG. 4, in addition to controlling rotation and movement of the machine's lamp socket 106 and heater wire guide 108, the machine's control system 402 also controls activation of a wire cutter 404. After the guide 108 has been moved along the axis of a CCFL 104 that is held by the socket 106, the wire cutter 404 is activated for the purpose of trimming the heater wire 102 to size. Such a step is especially useful if the heater wire 102 is provided by a spool 406 of heater wire housed within or by the machine 400. By way of example, the wire cutter 404 could take the form of a scissors, a razorblade, or a hot probe.

Figure 5:
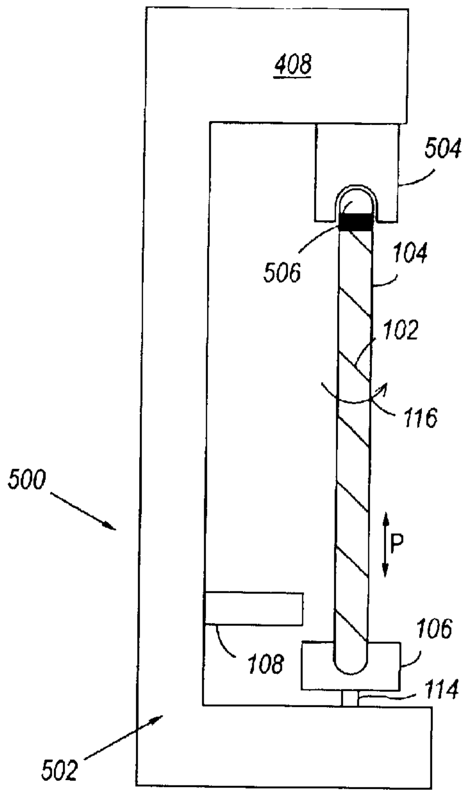

FIG. 5 illustrates a fourth variant of the FIG. 1 machine. In FIG. 5, the machine's control system 502 further activates a heat shrink unit 504. After the guide 108 has been moved along the axis of a CCFL 104 that is held by the socket 106, the heat shrink unit 504 is activated for the purpose of securing a heater wire 102 to the upper end of a lamp 104. The heat shrink unit 504 may function by placing heat shrink tubing 506 over the end of the lamp 104, including the end of the heater wire 102, and then heating the tubing 506 until it shrinks to fit the circumference of the lamp 104.

The wire cutter 404 and heat shrink unit 504 that are illustrated in FIGS. 4 & 5 can be configured to work sequentially within a single machine, and can be configured to withdraw into the machine's upper housing 408, 508 when not in use.

Figure 6:
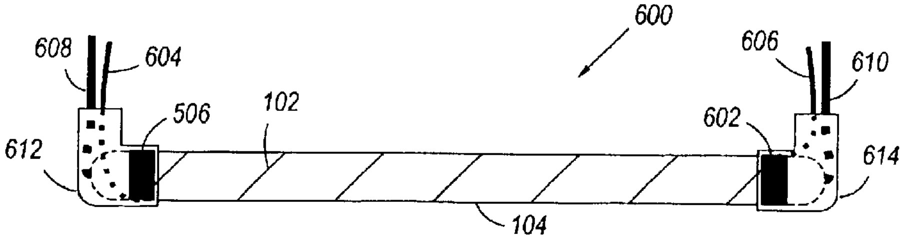
FIG. 6 illustrates a CCFL wrapped with a heater wire.

FIG. 6 illustrates an exemplary CCFL assembly 600. The lamp assembly 600 comprises a CCFL 104 that is wrapped by a heater wire 102. The heater wire 102 can be wrapped around the lamp 104 by any of the machines illustrated in FIGS. 1–5. Heat shrink tubing 506, 602 holds the heater wire 102 in place at each end of the lamp 104. External connection wires 604, 606 may be soldered to each end of the heater wire 102 as shown. This may be done before or after the heater wire 102 is wrapped around the lamp 104. Additional external connection wires 608, 610 provide a means for supplying power to the lamp 104. Boots 612, 614, caps or other means may be used to relieve stress from the lamp's electrical components 102, 604–610 so that the lamp assembly 600 may be more easily handled. If desired, the heater wire 102, heat shrink tubing 602, external connection wires 606, 610, and boot 614, or combinations thereof, may be attached to the lamp 104 prior to use of the machines 100, 200, 300, 400, 500 illustrated in FIGS. 1–5. The socket 106 of a machine 100 for wrapping a heater wire 102 around a lamp 104 may be appropriately configured depending on the combination of items that are pre-attached to the lamp 104.

While all of the wire-wrapping machines 100, 200, 300, 400, 500 discussed so far are based on a moving heater wire guide 108 and a rotating lamp socket 106, other automated arrangements are contemplated for wrapping a heater wire 102 about a lamp 104. For example, the machines 700, 900, 1000 illustrated in FIGS. 7–10 utilize a stationary guide 108 and a moving (and rotating) lamp socket 702.

Figure 7:
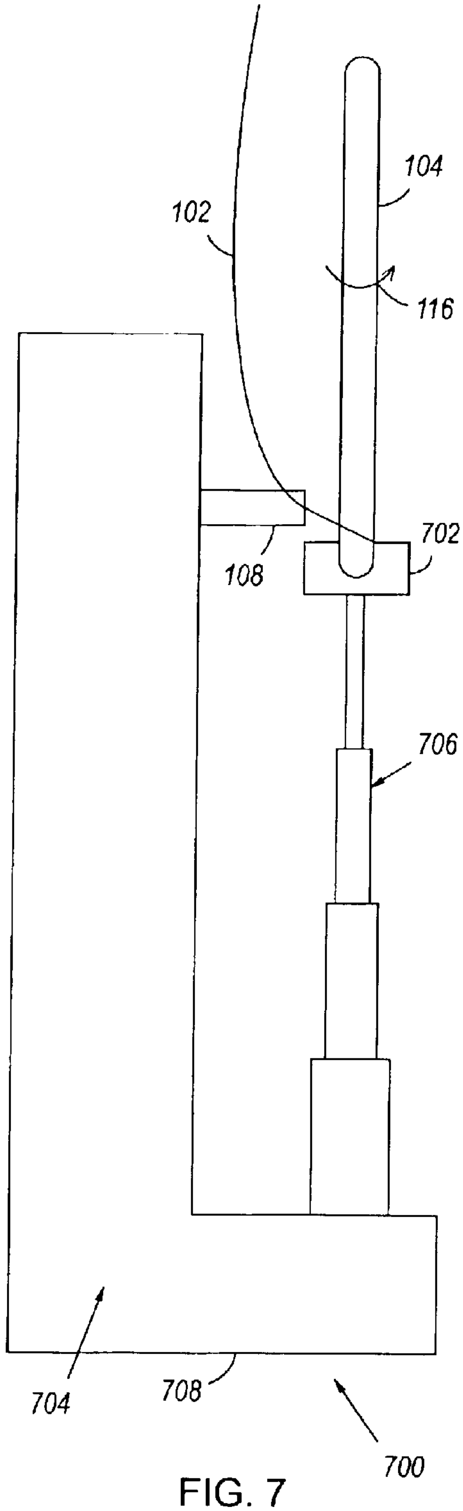
Figure 8:
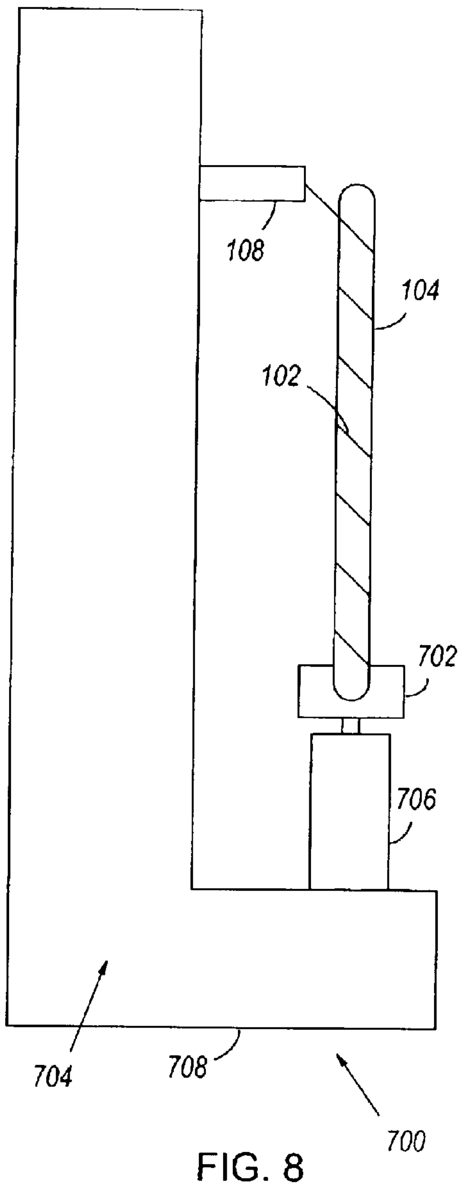

In FIGS. 7 & 8, a lamp socket 702 is mounted on an extension arm 706. FIG. 7 illustrates the arm 706 in its initial, extended position; and FIG. 8 illustrates the arm 706 in its final, retracted position. A control system 704 rotates the socket 702 while retracting the arm 706, thereby moving the socket 702 down and along the axis of a lamp 104 that is held by the socket 702. In this manner, a heater wire 102 that is guided by the guide 108 may be wrapped around the lamp 104. Alternatively, the machine 700 and control system 704 could be configured to wrap a heater wire 102 around a lamp 104 by extending the arm 706, or even wrap lamps in both directions (e.g., by wrapping one lamp during arm retraction, by wrapping another lamp during arm extension, etc.).

Although the arm 706 is shown to be a telescoping arm, the arm 706 may be variously configured. For example, the arm could be a rigid, unitary arm that is withdrawn into or through housing 708.

Figure 9:
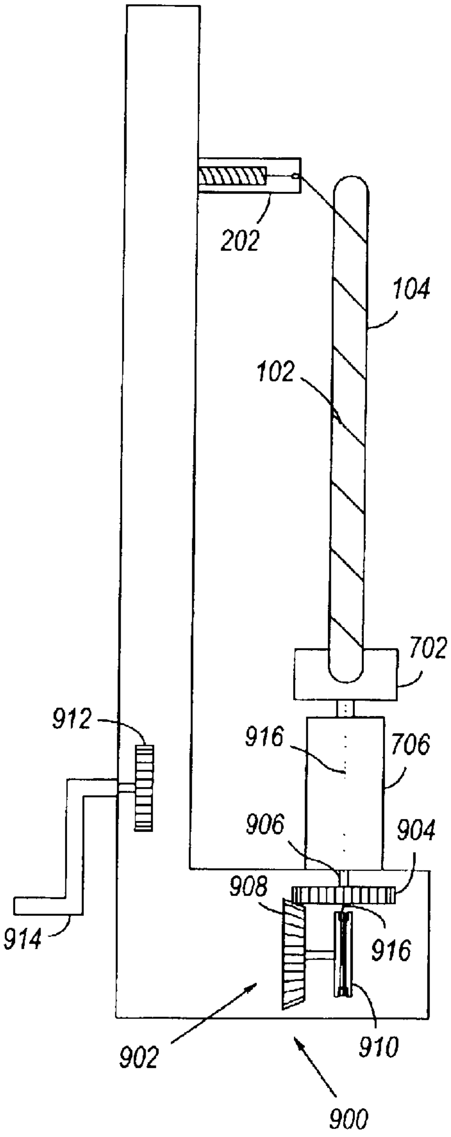

FIG. 9 illustrates a first variant of the FIG. 7 machine. The machine 900 functions similarly to the machine 700 illustrated in FIG. 7, but includes a gear set 902 that serves the purpose of part or all of the control system 704 identified in FIG. 7. The gear set 902 comprises a first gear 904 that is attached to the shaft 906 of the lamp socket 702; a second gear 908 that is attached to a pulley 910; and a third gear 912 that is attached to a crank 914 for initiating movement of the gear set 902. The pulley 910 driven by the second gear 908 spools a stiff but flexible wire 916 that serves to expand and contract the arm 706 as the pulley 910 turns. In addition to the gears 904, 908, 912 shown, the gear set 902 may comprise other gears and/or intermediary devices for the purpose of driving the gears 904, 908, 912 shown.

As will be understood by one of ordinary skill in the art, the gears 904, 908, 912 of the gear set 902 may be variously sized to adjust the pitch (P) of a heater wire 102 as it is wrapped around a lamp 104. Furthermore, the gears 904, 908, 912 illustrated in FIG. 9 are only exemplary, and the gears 904, 908, 912 of a gear set 902 could take a variety of forms, such as ring gears, pinion gears, worm gears, and so on. Some or all of the gears 904, 908, 912 illustrated in FIG. 9 could also be replaced by pulleys, and then connected with any number of belts, wires, tensioners, or other means.

Figure 10:
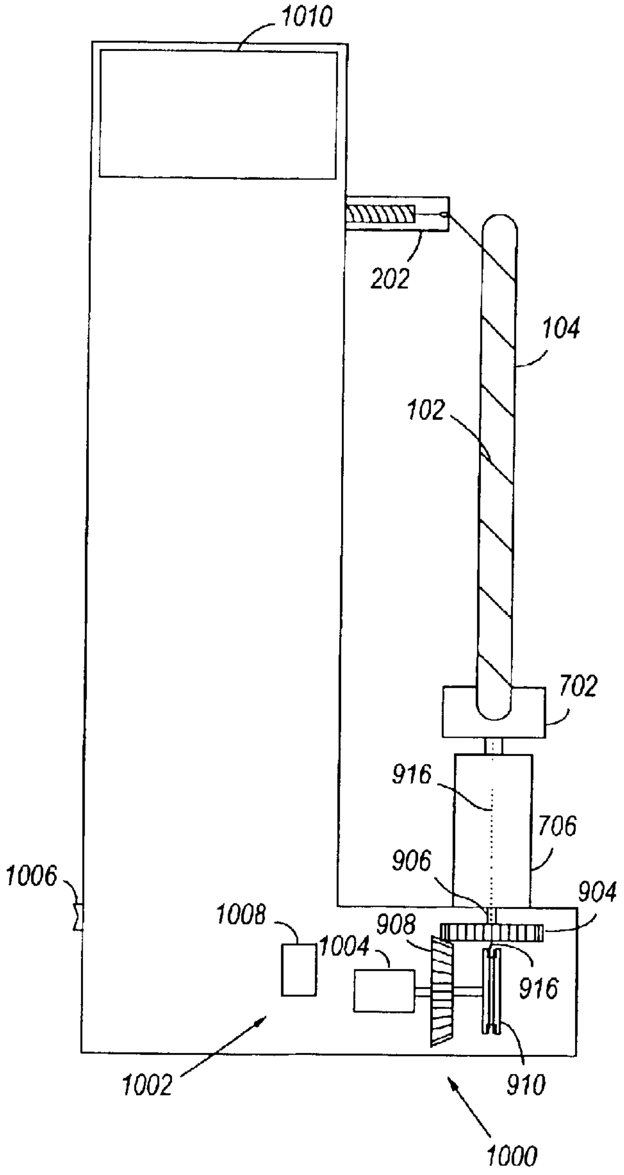

FIG. 10 illustrates a second variant of the FIG. 7 machine. Again, the machine 1000 functions similarly to the machine 700 illustrated in FIG. 7. However, part or all of the control system 704 identified in FIG. 7 is electronically implemented. By way of example, an electronic control system 1002 is shown to comprise a DC motor 1004. The motor 1004 drives a gear 908, 904 and pulley 910 system similar to that which is shown in FIG. 9. One of ordinary skill in the art will recognize that additional and/or other types of motors and electronic drive systems may be substituted for the DC motor 1004.

The machine illustrated in FIG. 10 is provided with an optional switch 1006 for initiating operation of the machine's electronic control system 1002. The machine 1000 is also provided with an optional memory 1008 for storing a programmed sequence of instructions. Additionally, the machine 1000 is provided with a unit 1010 comprising a wire cutter and heat shrink unit. The components of the unit 1010 may be activated by the machine's control system 1002 similarly to how the wire cutter 404 and heat shrink unit 504 illustrated in FIGS. 4 & 5 are activated.

Figure 11:
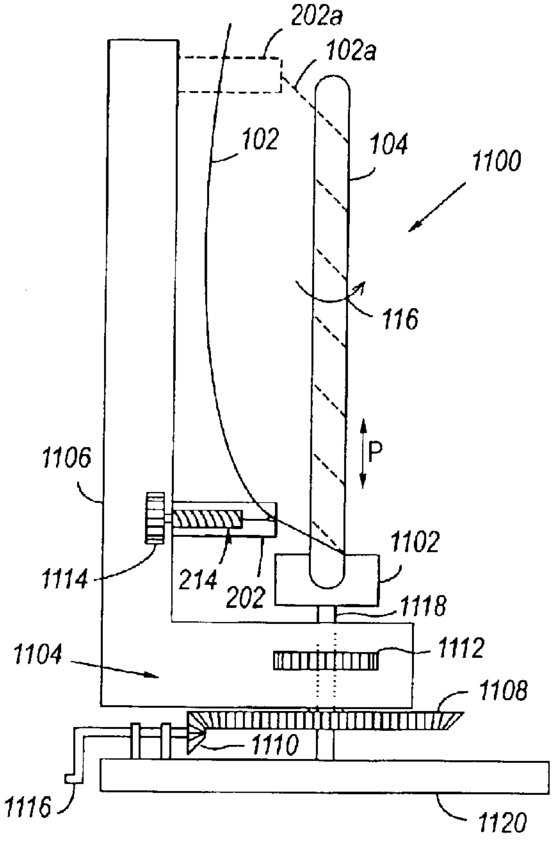

FIG. 11 illustrates yet another machine 1100 for wrapping a heater wire 102 around a CCFL 104. The machine 1100 is similar to the machine 100 illustrated in FIG. 1 in that a heater wire guide 202 moves along the axis of a CCFL 104 held by a lamp socket 1102. However, instead of moving the guide 202 upward while rotating the socket 1102, the machine's control system 1104 moves the guide 202 upward while spiraling the guide 202 around the socket 1102. By way of example, the machine 1100 accomplishes this task by means of a crank driven gear set 1108, 1110, 1112, 1114 that couples the socket 1102 and the guide 202. The first of the gears 1108 is fixed to the housing 1106. A second gear 1110 is splined to a crank 1116, and is positioned such that it meshes with the first gear 1108. The housing 1106 is attached via suitable bearings (not shown) to the shaft 1118 that holds the socket 1102. The shaft 1118 is mounted to a base 1120. In this manner, turning the crank 1116 initiates movement of the gear set 1108–1114 and causes the housing 1106 to spiral around the socket 1102. A third gear 1112 is splined to the shaft 1118. The third gear 1112 is then coupled directly or indirectly (e.g., by means of other gears) to a fourth gear 1114 that is coupled to the guide 202. The spiral movement of the housing 1106 thereby leads to upward or downward movement of the guide 202 (depending on the direction in which the crank 1116 is turned).

Figure 12:
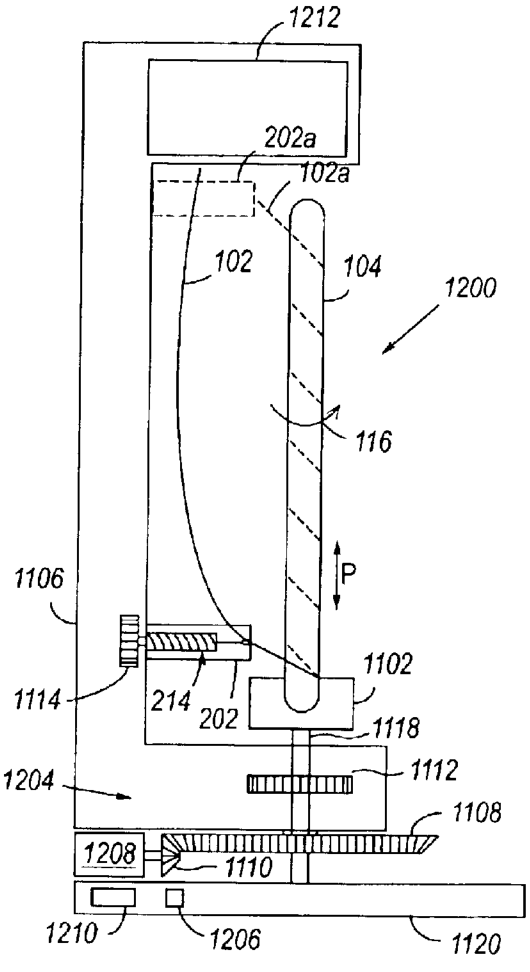

FIG. 12 illustrates a variant of the FIG. 11 machine. The machine 1200 functions similarly to the machine 1100 illustrated in FIG. 11, but comprises an electronic control system 1204 in lieu of a crank-driven control system. By way of example, the control system 1204 comprises a gear set 1108, 1110, 1112, 1114 that is identical to the gear set illustrated in FIG. 11. Movement of the gear set is initiated by a switch 1206 that supplies current to a motor 1208. The motor 1208 drives gear 1110, and thereby drives the remaining gears of the gear set. One of ordinary skill in the art will recognize that additional and/or other types of motors and electronic drive systems may be substituted for the motor 1208.

The machine illustrated in FIG. 12 is provided with an optional memory 1210 for storing a programmed sequence of instructions. Additionally, the machine 1200 is provided with a unit 1212 comprising a wire cutter and heat shrink unit. The components of the unit 1212 may be activated by the machine's control system 1204 similarly to how the wire cutter 404 and heat shrink unit 504 illustrated in FIGS. 4 & 5 are activated.

In FIGS. 11 & 12, the rate of travel of the guide 202 may be adjusted in relation to the rate of rotation of the socket 1102 so that the wire 102 wraps the lamp 104 at a desired pitch (P). This adjustment may be permanent (e.g., if the adjustment is contemplated in the machine's initial design and then fixed in the machine's hardware, software, etc.) or temporary (e.g., if the adjustment may be made by turning a knob, updating software, etc.). Alternatively, the guide 202 could be fixed at position 202*a*. If the guide 202 is fixed, the pitch (P) of the wire 102 will vary along the length of the lamp 104. This variance, however, can be limited by positioning the guide 108 sufficiently distant from the lamp 104.

As will be understood by one of ordinary skill in the art, the gears 1108-1114 of the machines 1100 and 1200 may be variously sized to adjust the pitch (P) of a heater wire 102 as it is wrapped around a lamp 104. Furthermore, the gears 1108–1114 illustrated are only exemplary, and the gears 1108–1114 of a gear set could take a variety of forms, such as ring gears, pinion gears, worm gears, and so on. Some or all of the gears 1108–1114 illustrated could also be replaced by pulleys, and then connected with any number of belts, wires, tensioners, or other means.

Although the machines illustrated in FIGS. 11 & 12 show lamps being wrapped bottom-to-top, each of these machines could also wrap lamps top-to-bottom; and if desired, the machines could even wrap lamps in both directions so that a first lamp is wrapped bottom-to-top, a second lamp is wrapped top-to-bottom, and so on.

Figure 13:
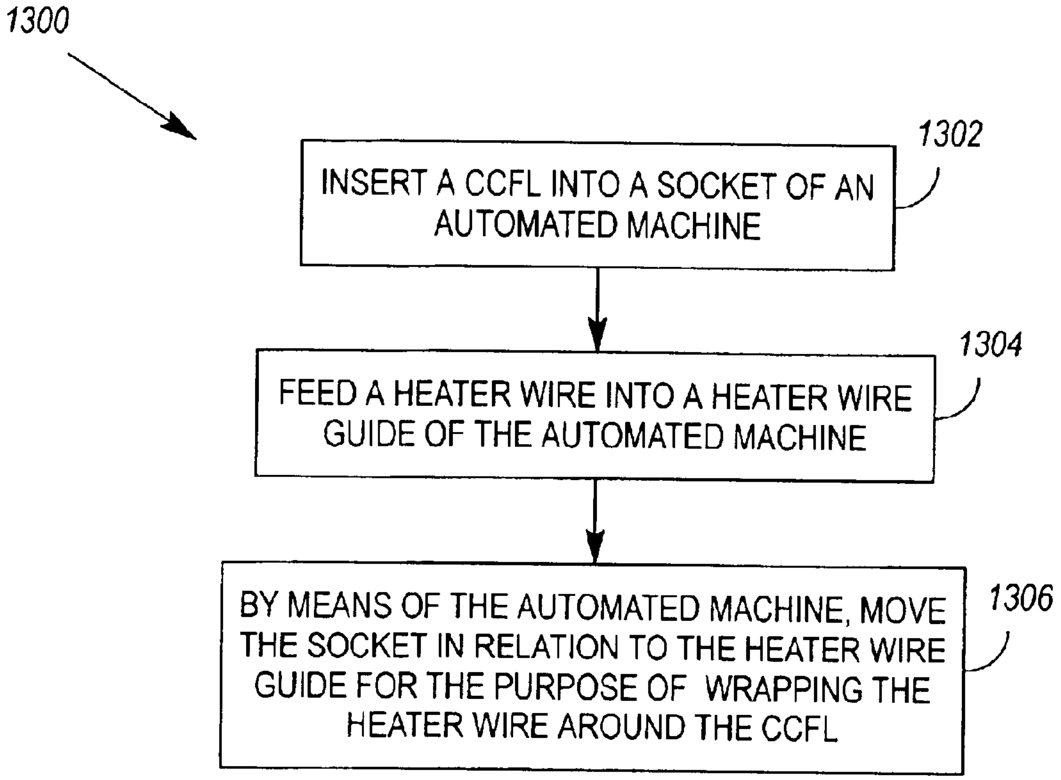
FIG. 13 illustrates a process for wrapping a CCFL with a heater wire.

FIG. 13 illustrates a process 1300 for wrapping a CCFL with a heater wire. The process 1300 may be implemented by various of the machines 100, 200, 300, 400, 500, 700, 900,1000, 1100, 1200 disclosed herein, as well as by other machines.

In accordance with the method 1300, a CCFL is inserted 1302 into a socket of an automated machine, and a heater wire is fed 1304 into a heater wire guide of the automated machine. By means of the automated machine, the socket is then moved 1306 in relation to the heater wire guide for the purpose of wrapping the heater wire around the CCFL. Optionally, the process may comprise securing the heater wire to at least one end of the CCFL.

The embodiments disclosed above can help maintain the quality of CCFL assemblies 600 (e.g., fewer broken lamps, fewer fingerprints on lamps, and/or more consistent heater wire pitch (P)). The embodiments can also help increase the rate at which CCFL assemblies 600 are produced.

The heater wire disclosed in the above embodiments may be any wire having a resistivity that is sufficient to heat a CCFL so that it may be powered more quickly. Depending on the device in which the lamp is to be used, as well as the environment in which the lamp is to be used, it may be desirable to use a heater wire that produces more or less heat. By way of example, the heater wire may be a Nickel-Chromium (NiCr) heater wire.

What is claimed is:

1. A machine for wrapping a heater wire around a cold cathode fluorescent lamp (CCFL), comprising:

a CCFL socket;

a heater wire guide; and a control system that rotates the socket while moving the guide along the axis of a CCFL that is held by the socket.

2. The machine of claim 1, further comprising a tensioner for applying tension to a heater wire that is guided by the guide.

3. The machine of claim 1, wherein the control system comprises:

a gear set that couples the socket and the guide; and a crank for initiating movement of the gear set.

4. The machine of claim 1, wherein the control system comprises:

at least one motor that drives the socket and guide; and a switch for initiating operation of the at least one motor.

5. The machine of claim 1, wherein the control system comprises a memory storing a programmed sequence of instructions.

6. The machine of claim 1, further comprising a wire cutter, wherein the control system activates the wire cutter after the guide has been moved along the axis of a CCFL held by the socket.

7. The machine of claim 1, further comprising a heat shrink unit, wherein the control system activates the heat shrink unit, after the guide has been moved along the axis of a CCFL held by the socket, to secure a heater wire to at least one end of the CCFL.

8. A machine for wrapping a heater wire around a cold cathode fluorescent lamp (CCFL), comprising:

a CCFL socket;

a heater wire guide; and a control system that rotates the socket while holding the guide in a fixed position.

9. The machine of claim 8, further comprising a tensioner for applying tension to a heater wire that is guided by the guide.

10. The machine of claim 8, wherein the control system comprises:

a gear set that couples the socket and the guide; and a crank for initiating movement of the gear set.

11. The machine of claim 8, wherein the control system comprises:

at least one motor that drives the socket and guide; and a switch for initiating operation of the at least one motor.

12. The machine of claim 8, wherein the control system comprises a memory storing a programmed sequence of instructions.

13. The machine of claim 8, further comprising a wire cutter, wherein the control system activates the wire cutter after the guide has been moved along the axis of a CCFL held by the socket.

14. The machine of claim 8, further comprising a heat shrink unit, wherein the control system activates the heat shrink unit, after the guide has been moved along the axis of a CCFL held by the socket, to secure a heater wire to at least one end of the CCFL.

15. A machine for wrapping a heater wire around a cold cathode fluorescent lamp (CCFL), comprising:

a CCFL socket;

a heater wire guide; and a control system that rotates the socket while moving the socket along the axis of a CCFL that is held by the socket.

16. The machine of claim 15, further comprising a tensioner for applying tension to a heater wire that is guided by the guide.

17. The machine of claim 15, wherein the control system comprises:

a gear set that is coupled to the socket; and a crank for initiating movement of the gear set.

18. The machine of claim 15, wherein the control system comprises:

at least one motor that drives the socket; and a switch for initiating operation of the at least one motor.

19. The machine of claim 15, wherein the control system comprises a memory storing a programmed sequence of instructions.

20. The machine of claim 15, further comprising a wire cutter, wherein the control system activates the wire cutter after the socket has been moved along the axis of a CCFL held by the socket.

21. The machine of claim 15, further comprising a heat shrink unit, wherein the control system activates the heat shrink unit, after the socket has been moved along the axis of a CCFL held by the socket, to secure a heater wire to at least one end of the CCFL.

22. A machine for wrapping a heater wire around a cold cathode fluorescent lamp (CCFL), comprising:

a CCFL socket;

a heater wire guide; and a control system that spirals the guide around, and along the axis of, a CCFL that is held by the socket.

23. The machine of claim 22 further comprising a tensioner for applying tension to a heater wire that is guided by the guide.

24. The machine of claim 22, wherein the control system comprises:

a gear set that couples the socket and the guide; and a crank for initiating movement of the gear set.

25. The machine of claim 22, wherein the control system comprises:

at least one motor that drives the socket and guide; and a switch for initiating operation of the at least one motor.

26. The machine of claim 22, wherein the control system comprises a memory storing a programmed sequence of instructions.

27. The machine of claim 22, further comprising a wire cutter, wherein the control system activates the wire cutter after the guide has been spiraled around, and along the axis of, a CCFL held by the socket.

28. The machine of claim 22, further comprising a heat shrink unit, wherein the control system activates the heat shrink unit, after the guide has been spiraled around, and along the axis of, a CCFL held by the socket, to secure a heater wire to at least one end of the CCFL.

29. A machine for wrapping a heater wire around a cold cathode fluorescent lamp (CCFL), comprising:

means for holding a CCFL;

means for guiding a heater wire; and means for moving said holding means in relation to said guide means for the purpose of wrapping a heater wire around a CCFL that is held by the holding means.

30. A cold cathode fluorescent lamp (CCFL) wrapped with a heater wire, prepared by a process comprising:

inserting the CCFL into a socket of an automated machine;

feeding the heater wire into a heater wire guide of the automated machine; and by means of the automated machine, moving the socket in relation to the heater wire guide for the purpose of wrapping the heater wire around the CCFL.

31. The CCFL of claim 30, wherein the process further comprises securing the heater wire to at least one end of the CCFL.

32. The CCFL of claim 30, wherein the heater wire is a Nickel-Chromium heater wire.

33. The CCFL of claim 30, wherein the automated machine rotates the socket while moving the guide along the axis of the CCFL.

34. The CCFL of claim 30, wherein the automated machine rotates the socket while holding the guide in a fixed position.

35. The CCFL of claim 30, wherein the automated machine rotates the socket while moving the socket along the axis of the CCFL.

36. The CCFL of claim 30, wherein the automated machine spirals the guide around, and along the axis of, the CCFL lamp.

* * * * *